US008670784B2

(12) United States Patent
Sellschopp

(10) Patent No.: US 8,670,784 B2
(45) Date of Patent: Mar. 11, 2014

(54) METHOD FOR OPERATING A MOBILE COMMUNICATION DEVICE AND MOBILE COMMUNICATION DEVICE

(75) Inventor: Stefan Sellschopp, Dachau (DE)

(73) Assignee: Audi AG, Ingolstadt (DE)

( * ) Notice: Subject to any disclaimer, the term of this patent is extended or adjusted under 35 U.S.C. 154(b) by 79 days.

(21) Appl. No.: 13/498,028

(22) PCT Filed: Aug. 7, 2010

(86) PCT No.: PCT/EP2010/004842
§ 371 (c)(1),
(2), (4) Date: Jun. 6, 2012

(87) PCT Pub. No.: WO2011/035830
PCT Pub. Date: Mar. 31, 2011

(65) Prior Publication Data
US 2012/0252428 A1    Oct. 4, 2012

(30) Foreign Application Priority Data
Sep. 23, 2009    (DE) .................. 10 2009 042 617

(51) Int. Cl.
*H04W 24/00* (2009.01)
(52) U.S. Cl.
USPC .................. 455/456.1; 455/406; 340/988
(58) Field of Classification Search
USPC ............ 455/406–408, 456.1–456.6; 340/988, 340/989
See application file for complete search history.

(56) References Cited

U.S. PATENT DOCUMENTS

| 6,973,323 | B2 * | 12/2005 | Oesterling et al. ......... 455/456.4 |
| 2002/0068573 | A1 | 6/2002 | Raverdy et al. |
| 2003/0232614 | A1 | 12/2003 | Squibbs |
| 2003/0236818 | A1 | 12/2003 | Bruner et al. |
| 2004/0266454 | A1 | 12/2004 | Nielsen et al. |
| 2005/0132024 | A1 * | 6/2005 | Habaguchi et al. ........... 709/219 |
| 2006/0094445 | A1 | 5/2006 | Park |
| 2006/0154649 | A1 | 7/2006 | Pedersen et al. |
| 2006/0246878 | A1 | 11/2006 | Khoury |
| 2007/0124390 | A1 | 5/2007 | Sivakumar et al. |
| 2008/0132201 | A1 * | 6/2008 | Karlberg ....................... 455/407 |

FOREIGN PATENT DOCUMENTS

| DE | 10 2009 042 617.5 | 9/2009 |
| EP | 1 693 750 | 8/2006 |
| WO | 2005/050575 | 6/2005 |
| WO | 2006/002048 | 1/2006 |
| WO | PCT/EP2010/004842 | 8/2010 |

OTHER PUBLICATIONS

International Search Report for PCT/EP2010/004842, mailed on May 23, 2011.

(Continued)

*Primary Examiner* — Vladimir Magloire
(74) *Attorney, Agent, or Firm* — Staas & Halsey LLP

(57) ABSTRACT

A mobile communication device having the capability of using the Internet does the same depending on a situation. For example, in the home country, to which a flat rate applies, larger amounts of data are downloaded during Internet use than in foreign countries, to which a flat rate does not apply. Corresponding situation profiles can be set by a user. The Internet can then be used in a cost-optimized manner.

12 Claims, 1 Drawing Sheet

(56) References Cited

OTHER PUBLICATIONS

Neil Tucker, "Using Windows Vista Parental Control; Control the Computer and Internet Activity of Children," Article, Jul. 30, 2008, 3 pages, http://pc-tutorials.suite101.com/article.cfm/using_windows_vista_parental_control.

Rudolf Opitz, "Grenzverkehr, Mobilsurfen im In- und Ausland," c't 2009, Heft, 2 pages.
German Office Action for Germany Priority Patent Application No. 10 2009 042 617.5, issued on May 10, 2010.

* cited by examiner

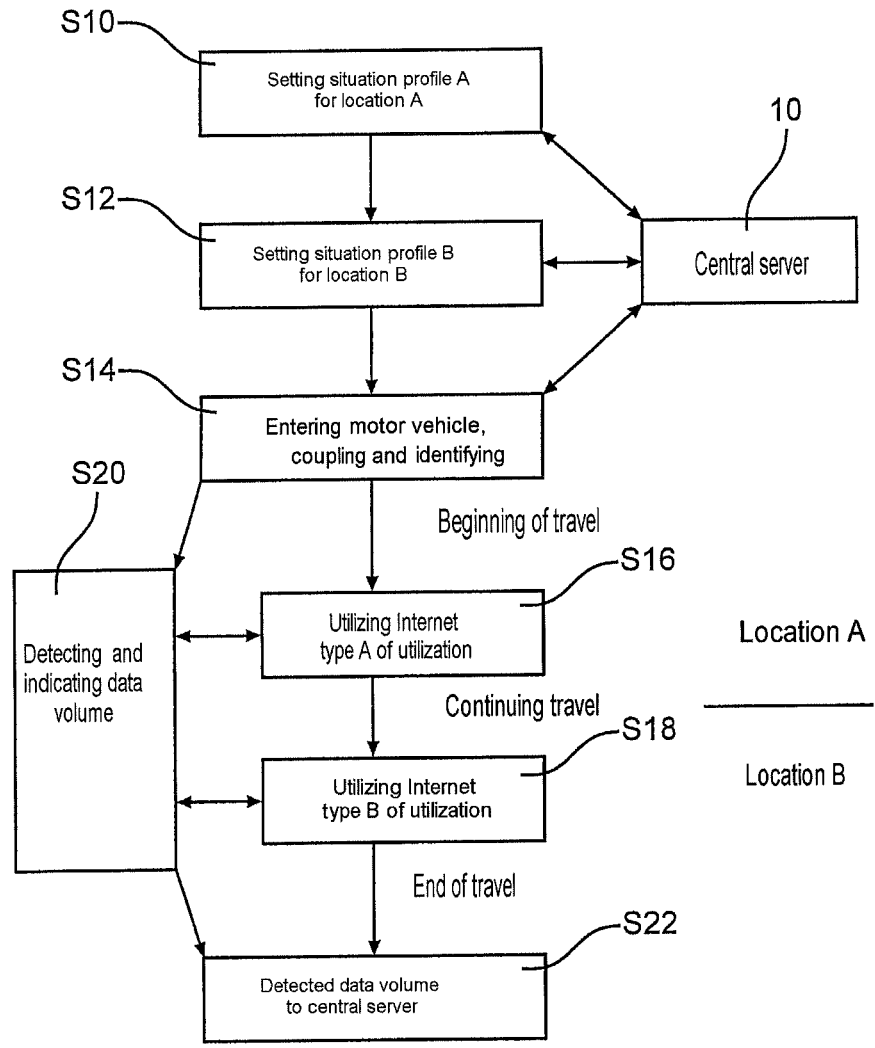

METHOD FOR OPERATING A MOBILE COMMUNICATION DEVICE AND MOBILE COMMUNICATION DEVICE

CROSS REFERENCE TO RELATED APPLICATIONS

This application is based on and hereby claims priority to International Application No. PCT/EP2010/004842 filed on Aug. 7, 2010 and German Application No. 102009042617.5 filed on Sep. 23, 2009, the contents of which are hereby incorporated by reference.

BACKGROUND

The invention relates to a method for operating a mobile communication device having the capability for utilizing the Internet.

A mobile communication device is understood to be any device which can be carried along by a user and wirelessly exchanges data. As a rule, current mobile communication devices are based on mobile radio telephones which are provided with additional functions.

The mobile use of the communication device has increased significance particularly when moving using a vehicle. However, it may be that the circumstances of utilization will then change.

For example, a mobile radio telephone can be used in a motor vehicle, being operable via operating units in the motor vehicle. In this case, communication of units in the motor vehicle with the mobile radio telephone takes place via Bluetooth® interfaces. In a motor vehicle, capabilities offered by the Internet can be appropriately utilized. For example, a route planner of the Internet can be used for the purpose of navigation, it then being possible to draw images with map representations or also photographs from space from the Internet and provide these in the motor vehicle. Such images are provided in particular by Google Earth®. A user will pay not inconsiderable amounts for downloading data from the Internet in the case of large amounts of data. He will possibly use a flat rate in order not to have to always bear costs in an individual case. Such a flat rate applies, e.g., to the home country (from the point of view of the customer who concludes a contract with his mobile communication network provider). If the user takes his mobile communication device into a foreign country, the costs may be not inconsiderable.

There have hitherto only been restricted possibilities of protecting a user of the Internet against excessive costs, or also only of displaying the costs to him, by using a mobile communication device.

WO 2006/002048A1 discloses that people, such as parents which want to monitor their children, can restrict the use of a mobile communication appliance by other people (for example by the children). Thus, it is possible to prescribe that particular calls can be made only at particular times or only at particular locations, which are captured by a position sensor in the mobile communication appliance. The same can be done for the use of the Internet by the people being monitored.

U.S. 2006/0246878A1 relates to the reception of messages by a mobile communication appliance, wherein the latter is notified of the presence of messages, then a check is performed using particular rules and a message is retrieved if appropriate. The rules can be prescribed or can be learnt gradually on the basis of user inputs.

EP 1 693 750 A1 states that the reception of data by a mobile communication appliance can be limited by counting in the latter and comparison with a threshold value.

U.S. 2003102368l8A1 relates to the provision of navigation data for a motor vehicle by a service center outside the motor vehicle. The service center is told the starting location and the destination for a journey, and the service center then transmits data for a route it has calculated to the motor vehicle. This is also done during the actual journey, in particular. In this case, it is possible to take account of the fact that transmission of data is technically possible only to a restricted degree or is desirable, for reasons of cost, at particular locations of the motor vehicle.

SUMMARY

One possible object of the invention is to demonstrate an approach for making use of the Internet via a mobile communication device in a motor vehicle more effective and thus more inexpensive.

The method proposed by the inventor thus includes that at least two situation profiles are established, namely by establishing requirements. Two mutually different situation profiles in each case differ by a requirement by which the extent of Internet utilization is determined when the Internet is utilized in accordance with the respective search report. The situation profiles in each case are allocated at least one situation parameter. This or these situation parameters define a situation, namely a separate situation for each situation profile. Before or during a utilization of the Internet, the mobile communication device then determines at least one situation parameter for a present situation. Data are then downloaded from the Internet to an extent which is predetermined by the situation profile allocated to the at least one situation parameter.

In connection with the use of the mobile communication device in a motor vehicle, there are central data processing devices which administer data belonging to the motor vehicle. One example is the portal in an Audi, myAudi® provided by the company of the applicant, with user accounts. There is thus provision to store in the central data processing device also the situation profiles. They are then called up by the mobile communication device in dependence on a situation parameter specifying a user.

As already mentioned, a data link is established typically between the mobile communication device and the motor vehicle (e.g. via a Bluetooth® interface). It is then necessary, among other things, to convey an identification of the motor vehicle to the central data processing device in order to call up situation profiles from a user account. The identification is then read out from units of the motor vehicle, conveyed via the data link to the mobile communication device and then forwarded by the latter to the central data processing device. This is then usually matched with the identification stored. In this so-called pairing, that is to say allocation of a user account to a motor vehicle, an identification of the mobile communication device is typically additionally transmitted, e.g. also the IMSI.

Certain situations which are associated with different frame conditions can be allocated a respective tailor-made situation profile according to the inventor's proposals. In the above example of the driver who is moving in the Internet and in a foreign country but only has a flat rate contract for his own country, it can thus be defined as a first situation that the driver is located in his home country and as a second situation that he is located in a foreign country. The extent of the data which are procured via the Internet is then restricted as soon as the user is located in the foreign country with the mobile communication device.

In the case of a simple embodiment of the method, a situation parameter is thus used for classifying a location of the mobile communication device. This location can be detected by a position detection device. More recent motor vehicles have such position detection devices.

It is also possible to define profiles for different users. Thus, a situation parameter is used alternatively or additionally for designating a user of the mobile communication device. Such a situation parameter can be given, for example, by or on a SIM (subscriber identity module) card for a mobile radio telephone which is coupled to the mobile communication device in any case. For example, a mobile radio telephone can recognize the user from his IMSI (international mobile subscriber identity).

Since, in particular, the downloading of images is associated with a large volume of data, different situation profiles preferably differ in the number and resolution of images to be downloaded during the utilization of the Internet, especially images to be downloaded from a predetermined server. In the case of Google Earth®, e.g., the number can be determined by the scale of a map representation if maps are to be downloaded for a particular driving route.

Since the utilization of audio data can also be associated with high costs, it is provided in a further preferred embodiment that different situation profiles differ in the bit rate with which such audio data are downloaded, this being appropriate, in particular, in connection with a streaming mode. For example, when using an Internet radio, particularly highly compressed data can be downloaded with little or no cost obligation or less compressed data with cost obligation, depending on the situation. Here, too, the adjustment at the situation profile can be carried out specifically for a predetermined server. Finally, the filter settings are different for different situation profiles in one preferred embodiment, especially those which relate to a prioritization of information. This is appropriate, e.g., in connection with the downloading of information about road traffic. It is possible to prioritize for a narrow regional area in order to download only traffic information for a particular region. If it is possible to download a greater volume of data, traffic information for adjoining or greater regions overall can also be downloaded as a supplement. This, too, can be adjusted specifically for a predetermined service of the providers.

Overall, different situation profiles can differ in general adjustments with respect to the downloading of data, but those adjustments can also be given specifically for different service providers. It is possible that the adjustments for a particular service provider are different from the adjustments for another service provider. If the data volume is to be restricted, one service provider may be interrogated with preference whilst interrogating the other service provider could be dispensed with. A user can then adjust specific adjustment parameters per service on how his terminal is to behave with different situation profiles.

It is advantageous if a user is informed of the extent to which the situation profiles predetermined by him are effective. A preferred embodiment is therefore that, during utilization of the Internet, the data volume of the data obtained from the Internet by the mobile communication device is determined and added together. It can then be reported to the user.

The reporting to the user does not need to take place directly at the mobile communication device but the corresponding data can also be conveyed to the central data processing device and administered by it. The data thus comprise the value for the data volume just determined and/or also the data volume added together.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The single FIGURE is a flow diagram for explaining the proposed methods and devices.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

At the beginning of the method, a user sets the situation profiles. In a step S10, he sets a situation profile for a location A, for example this can be for the class of all locations in his home country. In a step S12, he sets the situation profile B for a location B, for example this can be for the class of all locations in foreign countries. The providing in steps S10 and S12 is carried out, e.g., via a personal computer which is coupled to a central server 10. The central server in this case transmits, e.g. masks with menu entries to the personal computer and at the personal computer, inputs of the user are received, either inputs via an alphanumeric keyboard or inputs via a computer mouse for selecting a menu item etc.

In the central server, a user account can be stored and the user account can be associated with an identification. Both situation profiles A and B are then stored in the user account.

In step S14, the user enters his motor vehicle. He couples a mobile radio telephone to the motor vehicle by bringing it, for example, into the motor vehicle and a unit in the motor vehicle automatically recognizing the mobile radio telephone via a Bluetooth® interface. The motor vehicle transmits its motor vehicle number as identification to the mobile radio telephone which forwards it to the central server 10 together with its own identification, e.g. the IMSI on its SIM. The central server 10 thus obtains the identification for the user account and can unambiguously allocate the two situation profiles A and B to the motor vehicle.

After the beginning of travel, a utilization of the Internet begins in step S16. At this time, the motor vehicle is located at a location A so that the Internet is utilized in accordance with a type A of utilization. The type A of utilization is predetermined by the situation profile A. For example, the user has a contract with his communication service provider who provides him with a flat rate for utilizing the Internet in his home country. In type A of utilization, all possible types of images are thus downloaded in a number from the Internet which can be appropriately utilized in the motor vehicle. This can take place as part of a navigation e.g., images from Google Earth® can be used.

After continued travel, the motor vehicle is now located at location B in a foreign country. In step S18, the Internet is then utilized in accordance with a type B of utilization. In type B of utilization, for example, only images in a large map scale can be downloaded from the Internet so that the volume of data remains small. During steps S16 and S18, there is a continuous detection and indication of the data volume relating to the data conveyed via the Internet to the mobile radio telephone, according to step S20. After the end of travel, the entire volume of data detected is then conveyed to the central server, see step S22.

In the embodiment described, the proposed method thus enables the Internet to be utilized in accordance with two types (A and B) of utilization which are predetermined by the respective situation profiles which are adapted for the requirements of the user, especially e.g. to the environment provided by contracts with one or more telecommunication providers. The user is also provided with information about the volume of data and thus about the costs.

The implementation of the method just described requires a mobile radio telephone or generally a mobile communication device which has the capability for utilizing the Internet and whereby it is possible to switch between types of utilization and this can be determined by a situation parameter. In the motor vehicle, a position detection device such as a GPS receiver for example, can predetermine a situation parameter, in dependence on which the mobile radio telephone selects the type of utilization.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for operating a mobile communication device having Internet capability, comprising:
    establishing a plurality of different situation profiles, each situation profile defining a different situation using at least one situation parameter, each situation profile having an associated requirement that specifies a permitted extent of Internet utilization;
    storing the situation profiles in a user account in a central data processing device, the user account being assigned to a motor vehicle;
    establishing a data link between the mobile communication device and the motor vehicle;
    conveying identification information for the motor vehicle to the central data processing device;
    matching the identification information with the user account stored in the central data processing device, in order to call up situation profiles from the user account;
    before or during utilization of the Internet by the mobile communication device, determining a current value for each situation parameter based on a current situation; and
    downloading data from the Internet to the extent specified by the requirement associated with the situation profile defined by the current value.

2. The method according to claim 1, wherein
    a location situation parameter is used for classifying a location of the mobile communication device, and
    the location situation parameter has a current value which is detected by a position detection device.

3. The method according to claim 1, wherein an operator situation parameter is used for designating a user of the mobile communication device.

4. The method according to claim 1, wherein
    the requirement associated with each situation profile specifies a permitted number and permitted resolution of images to be downloaded during utilization of the Internet, and/or
    the requirement associated with each situation profile specifies a permitted bit rate while downloading audio files, and/or
    the requirement associated with each situation profile specifies Internet filter settings.

5. The method according to claim 1, wherein
    the requirement associated with each situation profile specifies a permitted number and permitted resolution of images to be downloaded during utilization of the Internet, specifies a permitted bit rate while downloading audio files, and specifies Internet filter settings.

6. The method according to claim 1, further comprising:
    during utilization of the Internet, determining a total data volume sum for Internet data usage by the mobile communication device; and
    reporting the data volume sum to a user.

7. The method according to claim 6, further comprising reporting the data volume sum to the central data processing device.

8. The method according to claim 1, further comprising:
    during utilization of the Internet in the current situation, determining a total data volume sum for Internet data usage by the mobile communication device; and
    reporting the data volume sum to a user.

9. The method according to claim 2, wherein an operator situation parameter is used for designating a user of the mobile communication device.

10. The method according to claim 9, wherein
    the requirement associated with each situation profile specifies a permitted number and permitted resolution of images to be downloaded during utilization of the Internet, specifies a permitted bit rate while downloading audio files, and specifies Internet filter settings.

11. The method according to claim 10, further comprising:
    during utilization of the Internet in the current situation, determining a total data volume sum for Internet data usage by the mobile communication device; and
    reporting the data volume sum to a user.

12. The method according to claim 11, further comprising reporting the data volume sum to the central data processing device.

* * * * *